United States Patent [19]

Oppliger et al.

[11] Patent Number: 4,852,430

[45] Date of Patent: Aug. 1, 1989

[54] BAND SAW STRAIGHTENING APPARATUS

[76] Inventors: Walter Oppliger, Unterhaltenstrasse 3, CH-3625 Heiligenschwendi; Jakob Müri, Bozeneggstrasse 11, CH-5107 Schinznach-Dorf, both of Switzerland

[21] Appl. No.: 164,099

[22] Filed: Mar. 4, 1988

[51] Int. Cl.⁴ .............................................. B23D 63/18
[52] U.S. Cl. ........................................... 76/27; 72/179
[58] Field of Search .................... 76/27, 25 R; 72/226, 72/176, 179

[56] References Cited

U.S. PATENT DOCUMENTS 510,210 12/1893 Toomer ..................................... 76/27
2,623,414 12/1952 Senard ..................................... 76/27

FOREIGN PATENT DOCUMENTS 3313160 7/1984 Fed. Rep. of Germany .......... 76/27
2229492 12/1974 France ..................................... 76/27

OTHER PUBLICATIONS

Armstrong Manufacturing Co. Literature, Portland, Ore., Armstrong Stationary Stretcher Rolls, pp. 53–57, section 6.

Primary Examiner—Roscoe V. Parker
Attorney, Agent, or Firm—Price, Heneveld, Cooper, DeWitt and Litton

[57] ABSTRACT

A band saw straightening machine having a sensor for detecting unevenness, a straightening station having special pairs of cooperative, complementarily shaped, blade staddling convex and concave rollers, a blade velocity measuring device, and a blade drive station, the pairs of respective rollers being actuated to operate on the blade when triggered with detection of unevenness by the sensor.

11 Claims, 2 Drawing Sheets

BAND SAW STRAIGHTENING APPARATUS

FIELD OF THE INVENTION

This invention relates to band saw straightening apparatus for the elimination of unevenness in band saw blades with sensor controlled straightening rollers disposed on opposite sides of the saw blade.

When band saws are used for cutting wood, unevenness appearing on the saw blades can quite rapidly assume such dimensions that such severely impairs the efficiency and precision of the band saw. Band saw blades therefore have to be straightened at regular intervals, i.e. unevenness has to be eliminated. This has previously usually been done by hand on a straightening bench using a hammer against a flat steel anvil. This is a laborious and lengthy procedure and, moreover, only produces relatively imprecise results.

DESCRIPTION OF THE PRIOR ART

German Pat. No. 33 13 160 describes a device intended to eliminate longitudinal and planar deformations in band saw blades. This apparatus has rollers on both sides of the saw blade which are so disposed in relation to one another that the saw blade can be reshaped in a direction opposite to that of the distortion. The roller on one side is disposed in each case in the intermediate space between two spaced rollers on the other side. To stretch certain areas, individual pressure rollers are urged towards each other so that the saw blade material lying therebetween is distorted by way of being stretched. This device is used on the saw blade during cutting, with the intended result that the saw blade does not need to be removed from the saw. This device is not suitable for dealing with the unevenness with which the present case is particularly effective, i.e. bumpy distortions usually limited to small areas and which are mainly caused by sawdust accumulation during operation. French patent 2,229,492 discloses a saw blade straightening machine having a pair of rollers of different rim width, the roller having the larger width being located on the concave side of the blade.

SUMMARY OF THE INVENTION

It is an object of the present invention to provide a band saw straightening apparatus with which the unevenness can be eliminated down to deviations of about three hundreths of a millimeter. It is a further object of the invention to provide an automatic band saw straightening apparatus which does not require the full attention of an operator.

According to the present invention, there is provided a band saw straightening apparatus for elimination of unevenness in band saw blades, having a measuring station for the saw blade and a measuring gauge to detect unevenness in the blade and generate a signal corresponding to the unevenness, a straightening station with two pairs of special straightening rollers as well as means for pressing these rollers against the saw blade and a drive unit for the saw blade. The straightening station comprises two pairs of rollers. One pair for flattening upwardly directed unevenness has a roller with a convex roller surface disposed above the band and an opposing roller with a concave rolling surface disposed underneath the band saw path. The other pair for flattening downwardly directed unevenness has a roller with a concave roller surface disposed above the band saw path and a roller with a convex roller surface disposed below the band saw path.

According to a preferred embodiment of this invention, the rollers disposed beneath the saw blade are mounted on fixed axles and the rollers disposed above the saw blade are mounted on axles that are moveable for urging the rollers against the band saw blade.

According to a further embodiment of the invention the means for pressing the rollers against the saw blade consist of a pneumatic or hydraulic device plus lever arms.

A control unit is preferably provided to receive signals from the measuring gauge and the drive unit and process these to initiate a starting signal which triggers the pressing procedure.

Other preferred embodiments and details are set out in the following description of a preferred embodiment of the invention.

DESCRIPTION OF THE PREFERRED EMBODIMENT

Figure 1:
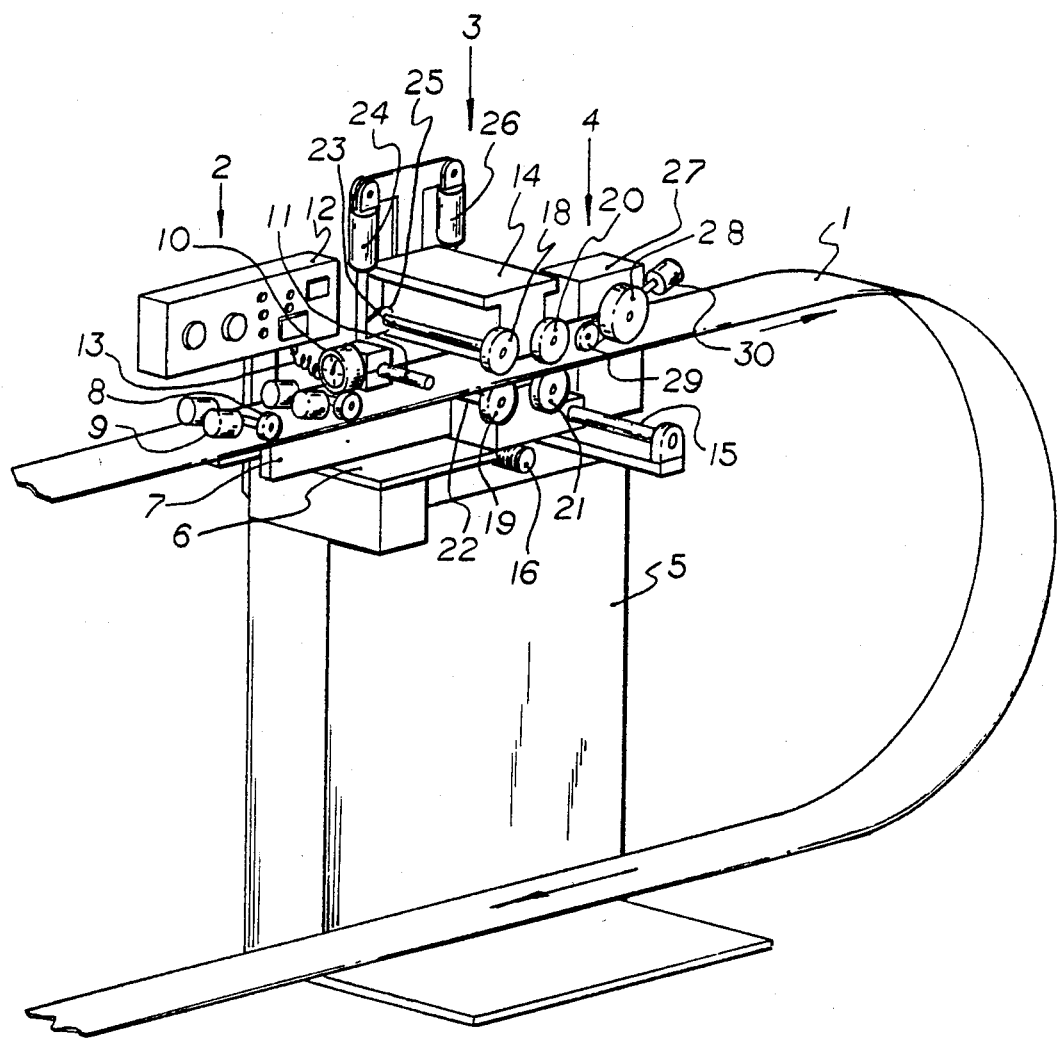
FIG. 1 is a perspective overall representation of a preferred embodiment of a band saw straightening apparatus of the invention.

FIG. 1 shows a band saw blade 1 inserted into the novel apparatus. Viewing the apparatus from left to right as shown in FIG. 1, it has essentially three stations, a measuring station 2 on the left hand side, a straightening station 3 in the center and a drive unit 4 on the right hand side. The three functional units are disposed on a rigid, massive stand 5 which is preferably of welded sheet steel.

Measuring station 2 has a table 6 under the saw blade on which flat supporting rails 7 are dispersed for supporting the saw blade. The supporting rails 7 consist of hardened and ground steel in order to ensure a precision base for measuring unevenness. Disposed above the saw blade 1 in the vicinity of each longitudinal edge of the band saw are means to bias both edges of the blade against the rails. These may be in the form of pairs of rollers 8 which press the saw blade against supporting rails 7. For this purpose rollers 8 are mounted on axles which may be arranged on a lever system provided with weights 9. The weights provide the biasing force. To insert and remove the saw blade, rollers 8 can be lifted off the saw blade by swinging i.e. pivoting the lever and weights.

A measuring gauge 10 is so disposed that its feeler pin or other sensor rests on the surface of the saw blade. The gauge is fixed to a shaft 11 which is mounted transversely to the band and guides the measuring gauge 10 across the width of the band as needed. Shaft 11 may for example be provided with a groove, so that the securing block for the measuring gauge is slidably mounted on the shaft and is prevented from swiveling by means of a pin running in the groove. Means e.g. mechanical, hydraulic, pneumatic and/or electrical, are provided (not shown in the figure) for thereby moving the measuring gauge transversely across the width of the saw blade to selected positions on the blade. As explained below, said means are adapted to move the sensor in synchronous manner with lateral moving of the straightening rollers.

More specifically, the sensor and straightening rollers can first be in one transverse position of the blade, and then successively shifted to other transverse positions until they ultimately move completely across the width of the blade. Likewise, so that the straightening rollers will be coordinated with this sensor, they will simultaneously be moved to the same relative transverse positions across the blade. The motive means to shift the rollers may likewise be mechanical, hydraulic, pneumatic and/or electrical. Thus, as the blade is longitudinally advanced, a particular segment will be sensed to detect deformation, i.e. unevenness, and acted upon as necessary by the straightening rollers.

Behind and above the measuring station 2 is an electronic control panel 12 shown disposed on a vertical arm. On this control panel are set out the controls for operation of the apparatus. They may, for example, include control means and a corresponding indicating dial to control the speed of passage of the band saw blade through the apparatus, control means and a corresponding indicating dial to control the number of passes for each longitudinal segment of the band saw blade prior to the feeler pin and straightening rollers moving transversely relative to the blade to the next blade segment, and a series of indicator and warning lights representing various functions of the apparatus. The electronic control may also operate audible alarms and a stop operation if necessary, e.g. in case of a blockage.

An electric cable 13 leads from measuring gauge 10 to electric control panel 12. Via this cable 13, control panel 12 receives a signal when the feeler pin or sensor of the measuring gauge moves vertically beyond a given preset tolerance, i.e. sensing a significant unevenness in a portion of the blade. This tolerance can be preset at control panel 12 at an amount of three hundredths of a millimeter or some other amount.

Straightening station 3 is essentially grouped around a central cast block 14. The case block 14 can be shifted along a shaft 15 transverse to the saw blade. Shifting is effected by a threaded spindle 16 which engages with a corresponding thread in the block 14 and is rotationally driven by a geared motor (not shown). Shifting transversely to the saw blade is effected in steps of, for example 5 mm, and occurs in time intervals that correspond to one or several passages of the saw blade as desired. With this stepwise feed the straightening station is moved and guided transversely across the saw blade in correlation with the measuring gauge upstream thereof. The terms upstream and downstream are intended to be descriptive relative to the direction of movement of the blade.

At the front end of block 14 is disposed a first pair of rollers 18, 19 and a second pair of rollers 20, 21. The second pair is downstream of the first pair, relative to the direction of blade advancement. The four rollers 18 to 21 have a common central level or reference plane. The rollers in each pair are vertically aligned with each other. The first pair of rollers 18, 19 in the form depicted serves to smooth out upwardly protruding unevenness in the saw blade, while the second pair of rollers 20, 21 as depicted serves to smooth out downwardly protuding unevenness in the saw blade. The lower roller 19 of the first pair runs on a shaft 22 which is so disposed that the roller constantly engages the saw blade. Similarly, the lower roller 21 of the second pair is so disposed on a shaft that it continually engages the saw blade. Upper roller 18 of the first pair is eccentrically disposed on a shaft 23. In this manner roller 18 can be removed from engagement with the saw blade, or pressed thereagainst, by turning the shaft 23. To press roller 18 down, a pneumatic cylinder actuator 24 is linked via lever 25 to the shaft 23 to rotate it. A corresponding lever system links up to a like shaft (not shown) on which roller 20 is eccentrically secured and which is turned by like pneumatic cylinder actuator 26.

Drive unit 4 is mounted on a housing 27. This drive unit is downstream of the measuring station and the straightening station to pull the blade through these latter stations. It has a drive roller 28 engaging the blade and driven by an electric motor (not shown) or the equivalent. The requisite pressing force is exerted by a lever and a weight 30. In front of, i.e. upstream of, drive roller 28 is situated a measuring roller 29 which measures by its rate of rotation the saw blade travel and transmits information continuously to control panel 12 regarding blade speed, i.e. distance traveled by the blade in a given time.

Figure 2:
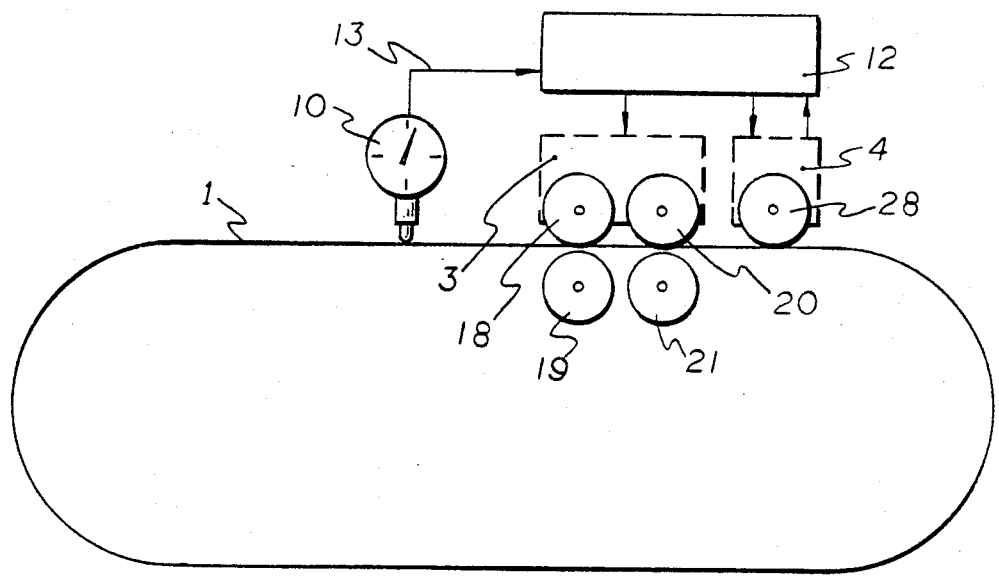
FIG. 2 is a schematic representation of the principle elements of the apparatus in FIG. 1.

Functioning of the apparatus may be seen with reference to the simplified schematic representation set out in FIG. 2. Saw blade 1 is driven by drive roller 28 from left to right as shown in FIG. 2. Straightening apparatus 3 and the measuring gauge 10 are so situated that the feeler pin or sensor of the measuring gauge lies in the vertical mid plane of 18, 19, 20 and 21. This is positioned at the longitudinal edge of the saw blade at the commencement of the straightening process by the gear motor which effects the lateral movement of the straightening device. In this position of the measuring gauge and also the straightening rollers, a track segment having a width which corresponds to the width of the rollers is straightening throughout the length of the saw blade. The straightening procedure for one track segment can be performed for just one passage or, if necessary in order to remove difficult deformations, for several passages of the saw blade through the stations. The number of passages per track segment is preferably set by control panel 12, or can be done manually.

When the measuring gauge locates unevenness lying outside the preset threshold tolerance value, measuring wheel 29 on the drive unit simultaneously records the distance of blade travel from the measuring gauge to the straightening rollers. Following expiry of the time interval to travel this distance the control unit 12 transmits a signal to the straightening unit to cause one of the two pneumatic cylinders 24 or 26 to press one of the two upper rollers with a preset pressure against the respective lower roller, by turning the corresponding shaft. If the unevenness is an upwardly oriented bump, the first roller 18 will be pressed down. If it is a depression, the second roller 20 is pressed down.

Figure 3A:
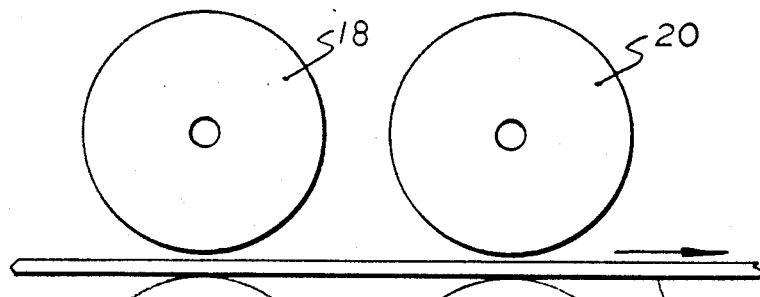
FIGS. 3A and 3B are enlarged representations of the straightening rollers in side and end view respectively.
Figure 3B:
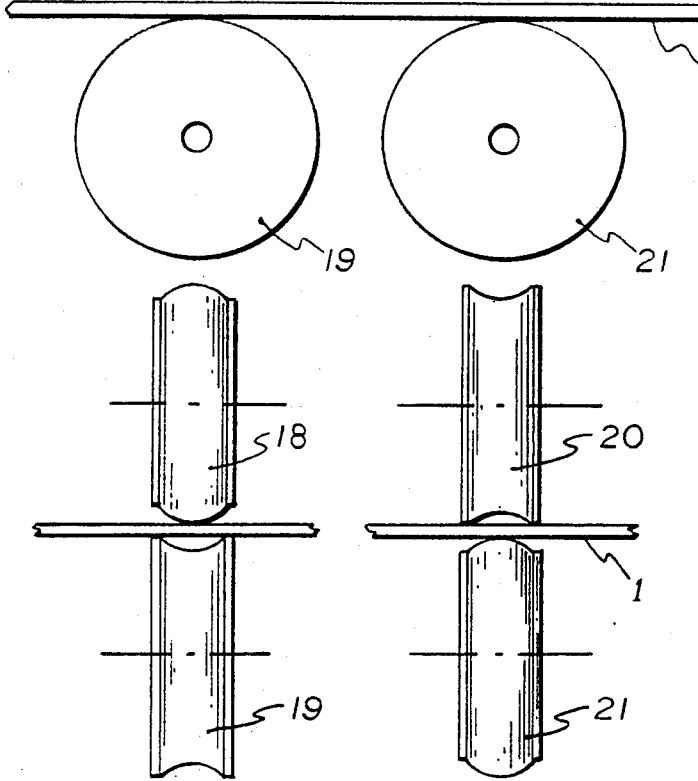

The shape and formation of the rollers and their function is shown in FIG. 2A and 3B. FIG. 3A shows a side view of the rollers 18, 19, 20, 21. Lying therebetween is saw blade 1. It can be seen that the lower two rollers 19, 21 engage the saw blade. The two upper rollers 18, 20 are shown elevated a small distance from the saw blade. As already mentioned, these are only pressed down when required.

FIG. 3B shows the rollers in end view. Roller 18 has a convex peripheral or rolling surface. Roller 19 lying below it has a complementary concave peripheral rolling surface of like configuration. When the upper roller is pressed down the saw blade portion is pressed by the convexity of the upper roller into the like shaped groove or channel of the lower roller to level it. The more the unevenness deviates or protrudes from the level plane of one face of the blade, the greater the pressure and force that the roller will tend to apply.

On the right hand side the action is reversed. The upper roller has a concave roller surface. Lower roller 21 has complementary convex peripheral roller surface of like shape. When upper roller 20 is pressed down, saw blade 1 is pressed by the convexity of lower roller 21 into the concavity of upper roller 20 so that downwards facing unevenness is evened out.

In a typical apparatus according to the invention, the force exerted by the roller would be of the order of 600 kg. Other pressures may be employed depending on the thickness, strength and quality of the saw blade and its speed of movement. In one embodiment of the invention, the blade may be driven at a speed of about 7,000 mm per minute.

Unevenness is usually largely eliminated after only one passage. Following several passages up to a maximum normally of no more than 5 times, the saw blade can again be described as being completely level. After the one or more selected number of passages for one track the straightening rollers and the measuring gauge are shifted transversely the amount of the roller width, e.g. ca. 5 mm so that the next track, i.e. blade portion can be smoothed out. This continues through successive positions across the blade width.

It has been found advantageous to provide a certain degree of play in the threaded spindle which serves to feed the straightening device transversely to the saw blade so that when the procedure is effected in the opposite direction, i.e. when the straightening device and the measuring gauge are shifted transversely in reverse there is an overlapping of the tracks. This is of particular advantage if wider rollers are used, for example 10 mm, to process wider saw blades more quickly.

Certain variations in the component orientation could be made without departing from the invention. Thus, the straightening roller pairs as shown could have rollers 18 and 19 downstream of rollers 20 and 21 so that the upstream rollers would have the convex roller on the bottom and the concave roller on top.

Also, in describing the preferred embodiment herein, the blade has been shown and described to be in horizontal orientation when being sensed, straightened and driven. Thus the blade straddling rollers have been described and shown as vertically above and below the blade, with the upper rollers movable vertically. Although this is expected to be the most common orientation, the invention is not intended to be limited by this terminology or positioning since the blade could be in vertical or even diagonal orientation when processed. The relative positions of the sensor and rollers to the blade and to each other is what is significant in this respect.

In view of variations which could be made in the invention, it is intended that the invention is not to be limited to the exemplary embodiment depicted and described in detail, but only by the appended claims and the reasonable equivalents thereto.

The embodiments of the invention in which an exclusive property or privilege is claimed are defined as follows.

1. A band saw straightening machine for the removal of unevenness in band saw blades comprising:
   drive means for moving the blade;
   a detector station including sensor means for the detection of unevenness in a blade moving therethrough;
   a straightening station including straightening means for removing unevenness in a blade moving therethrough;
   a measuring station including rate measuring means for determining the rate of movement of the blade between said detector station and said straightening station; and
   control means for causing said straightening means to function a controlled interval after the blade moves through said detector station to act on the blade to straighten it.

2. A band saw straightening apparatus for removing unevenness in band saw blades comprising:
   straightening rollers disposed on both sides of the saw blades for smoothing out uneven regions of the saw blade;
   a measuring station for recording unevenness in the blade, said measuring station comprising a flat pad for engaging the saw blade and measuring means for sensing the surface of the blade and generating a signal in response to unevenness in the blade;
   said straightening station comprising two pairs of straightening rollers, one pair for leveling of upwardly directed unevenness, and having a first roller with a convex roller surface disposed at one face of the blade and a second roller with concave rolling surface disposed opposite said first roller, the other pair for leveling of downwardly directed unevenness, and having a first roller with a concave roller surface disposed at said one face of said blade and a second roller with a convex rolling surface disposed opposite said first roller of said other pair;
   said straightening station having means for pressing the rollers against the blade;
   drive means for advancing the saw blade; and control means for correlating said sensing means with said straightening rollers and the rate of movement of said blade for pressing the rollers onto the saw blade at the appropriate time when the unevenness has arrived.

3. A band saw straightening apparatus according to claim 2 wherein said second rollers are on fixed axles and said first rollers are disposed on axles that are movable toward and away from the blade for selectively pressing the blade.

4. A band saw straightening apparatus according to claim 3 wherein the means for pressing the rollers onto the saw blade comprise a pneumatic device and lever arms for pressing the rollers.

5. A band saw straightening apparatus according to claim 2 wherein control means is provided for receiving the signals from the measuring means and selectively triggering the pressing action of said second rollers.

6. A band saw straightener comprising:
   sensor means for detecting unevenness in a blade moving therepast;
   straightening means straddling a blade path and cooperative with said sensor means for selectively pressing a blade traveling therebetween to straighten sensed unevenness in the blade;
   drive means for advancing a blade in a blade path past said sensor means and said straightening means;
   said straightening means comprising rollers positioned to straddle the passing blade and having complementary shaped peripheral rolling surfaces;
   said rollers comprising a first pair of blade straddling rollers and a second pair of blade straddling rollers;

said first pair having complementary concave and convex rolling surfaces and said second pair having complementary convex and concave rolling surfaces, with said first pair concave rolling surface being at the same face of the blade as said second pair convex rolling surface.

7. The band saw straightener in claim 6 wherein:

said sensor means is upstream of said straightening means; and said straightening means is actuable to press the blade in response to a predetermined amount of unevenness sensed by said sensor means, to be actuated only when said sensor means detects said predetermined amount of unevenness.

8. The band saw straightener in claim 6 wherein said second pair is downstream of said first pair.

9. The band saw straightening in claim 6 wherein in each pair, one roller has a fixed axle and the other roller is movable toward and away from the said one roller.

10. The band saw straightener in claim 9 including power means for moving each said other roller toward and away from the respective said one roller.

11. The band saw straightener in claim 6 wherein said straightening rollers and said sensor means are synchronously movable transversely of the blade advance, to act sequentially upon portions of the blade.

* * * * *